United States Patent
Hatta

(10) Patent No.: US 7,243,085 B2
(45) Date of Patent: Jul. 10, 2007

(54) HYBRID PERSONALIZATION ARCHITECTURE

(75) Inventor: Masashi Hatta, Hokkaido (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 474 days.

(21) Appl. No.: 10/824,655

(22) Filed: Apr. 13, 2004

(65) Prior Publication Data

US 2005/0004930 A1    Jan. 6, 2005

Related U.S. Application Data

(60) Provisional application No. 60/463,609, filed on Apr. 16, 2003.

(51) Int. Cl.
G06F 15/18    (2006.01)

(52) U.S. Cl. .............................. 706/12; 706/14; 706/46

(58) Field of Classification Search .................. 706/12, 706/14, 46; 707/3
See application file for complete search history.

(56) References Cited

U.S. PATENT DOCUMENTS

| | | | |
|---|---|---|---|
| 5,704,017 A * | 12/1997 | Heckerman et al. | 706/12 |
| 5,704,018 A * | 12/1997 | Heckerman et al. | 706/12 |
| 6,092,049 A * | 7/2000 | Chislenko et al. | 705/10 |
| 6,457,010 B1 * | 9/2002 | Eldering et al. | 707/10 |
| 6,529,891 B1 * | 3/2003 | Heckerman | 706/52 |
| 6,687,696 B2 | 2/2004 | Hofmann et al. | |
| 6,820,075 B2 * | 11/2004 | Shanahan et al. | 707/3 |
| 6,850,252 B1 * | 2/2005 | Hoffberg | 715/716 |
| 2003/0033287 A1 * | 2/2003 | Shanahan et al. | 707/3 |
| 2004/0205448 A1 | 10/2004 | Grefenstette et al. | |
| 2005/0022114 A1 * | 1/2005 | Shanahan et al. | 715/513 |

* cited by examiner

*Primary Examiner*—Joseph P Hirl
(74) *Attorney, Agent, or Firm*—Blakely, Sokoloff, Taylor & Zafman LLP

(57) ABSTRACT

Belief probabilities for ontological concepts within a preference model representing a belief of user preferences are determined. The belief probabilities are based on user feedback. A convolution of the belief probabilities and ontology co-occurrence probabilities is performed. A prioritized list from a plurality of documents based on the convolution is generated. In one aspect, the ontology co-occurrence probabilities for ontological concepts within a co-occurrence model are calculated. The ontology co-occurrence probabilities represent a probability of two ontological concepts being associated with a single document of the plurality of documents. In another aspect, the documents describe multimedia content.

69 Claims, 10 Drawing Sheets

HYBRID PERSONALIZATION ARCHITECTURE

RELATED APPLICATIONS

This application is related to and claims the benefit of U.S. Provisional Patent Application 60/463,609 entitled "Hybrid Personalization Architecture," filed Apr. 16, 2003, which is herein incorporated by reference.

FIELD OF THE INVENTION

This invention relates generally to personalization architectures, and more particularly to providing personalized television program recommendations.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2003, Sony Electronics, Inc., All Rights Reserved.

BACKGROUND OF THE INVENTION

As the proliferation of television content increases, viewers have a wide variety of programming available for viewing. With so much available programming, viewers may require assistance identifying programming which is of interest to them. One tool to assist viewers in finding programming of interest to them is an electronic programming guide (EPG). An EPG provides the ability for a viewer to query the EPG by program title, key words, or by channel. However, these queries assume that the viewer has prior knowledge of the programming available, and consequently, the returned results will be often limited based on the viewer's specific query. Additionally, in the context of personal video recording (PVR) devices, programs which may be of interest to viewers may be automatically recorded. The recommendations or suggestions made by the device are often based on perceived interests of the viewer. This is often referred to as "personalization". The efficacy of the personalization is closely tied to the specific algorithms used by the system to recommend programming.

SUMMARY OF THE INVENTION

Belief probabilities for ontological concepts within a preference model representing a belief of user preferences are determined. The belief probabilities are based on user feedback. A convolution of the belief probabilities and ontology co-occurrence probabilities is performed. A prioritized list from a plurality of documents based on the convolution is generated. In one aspect, the ontology co-occurrence probabilities for ontological concepts within a co-occurrence model are calculated. The ontology co-occurrence probabilities represent a probability of two ontological concepts being associated with a single document of the plurality of documents. In another aspect, the documents describe multimedia content.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the invention. The following detailed description is, therefore, not to be taken in a limiting sense, and the scope of the invention is defined only by the appended claims.

Although embodiments of the invention will be described particularly in the context of recommending television programming, it will be appreciated that aspects of the invention will be applicable to a wide variety of applications where multimedia content (e.g. television programs, video, audio, music, images, text documents, web documents, digitized data, etc.) is described in an associated document or within the content itself. Additionally, embodiments of the invention may be applicable to other areas of information filtering, such as a search engine for the Internet or otherwise.

Figure 1A:
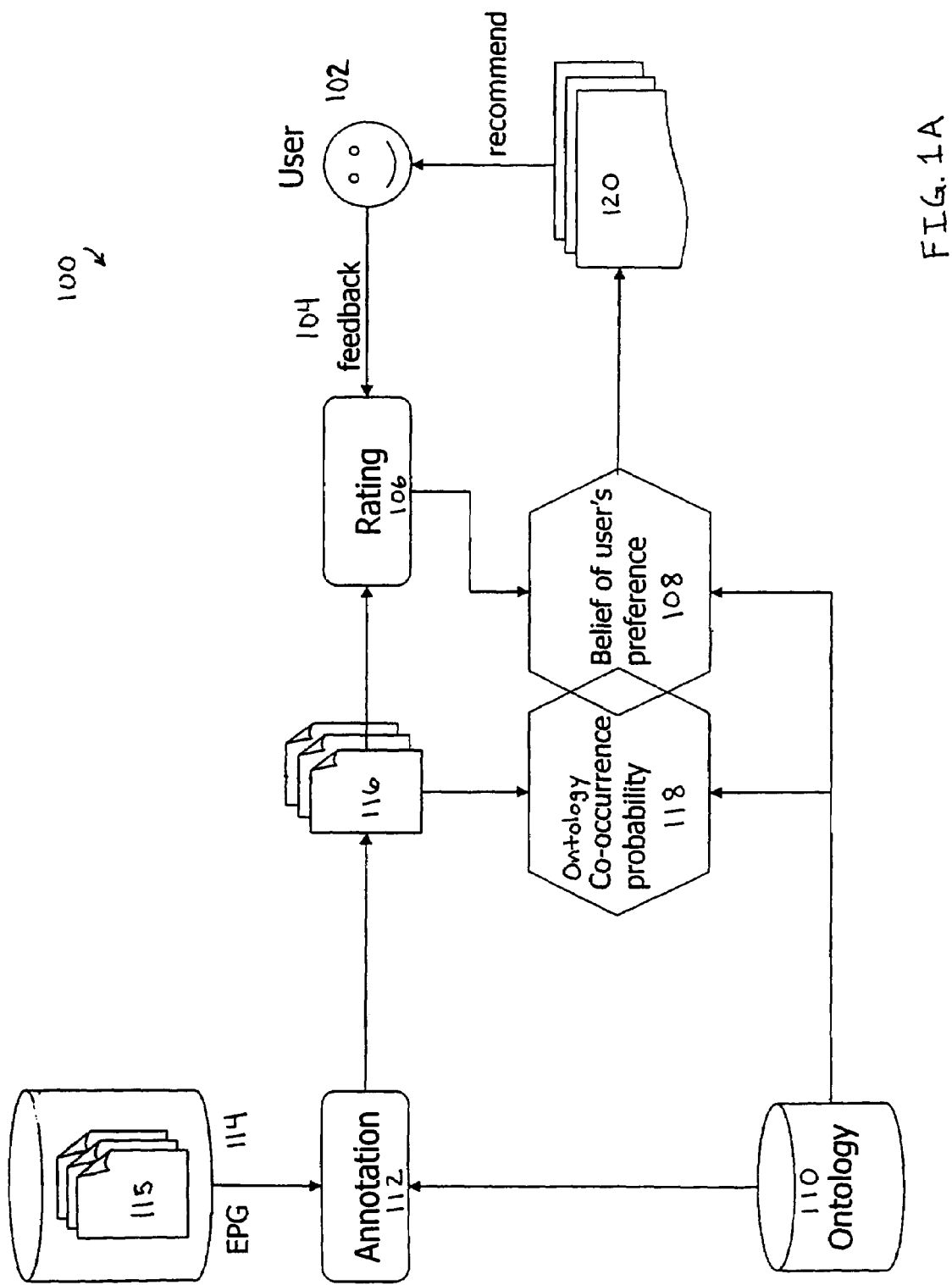
FIG. 1A is a diagram illustrating a system-level overview of an embodiment of the invention.
Figure 1B:
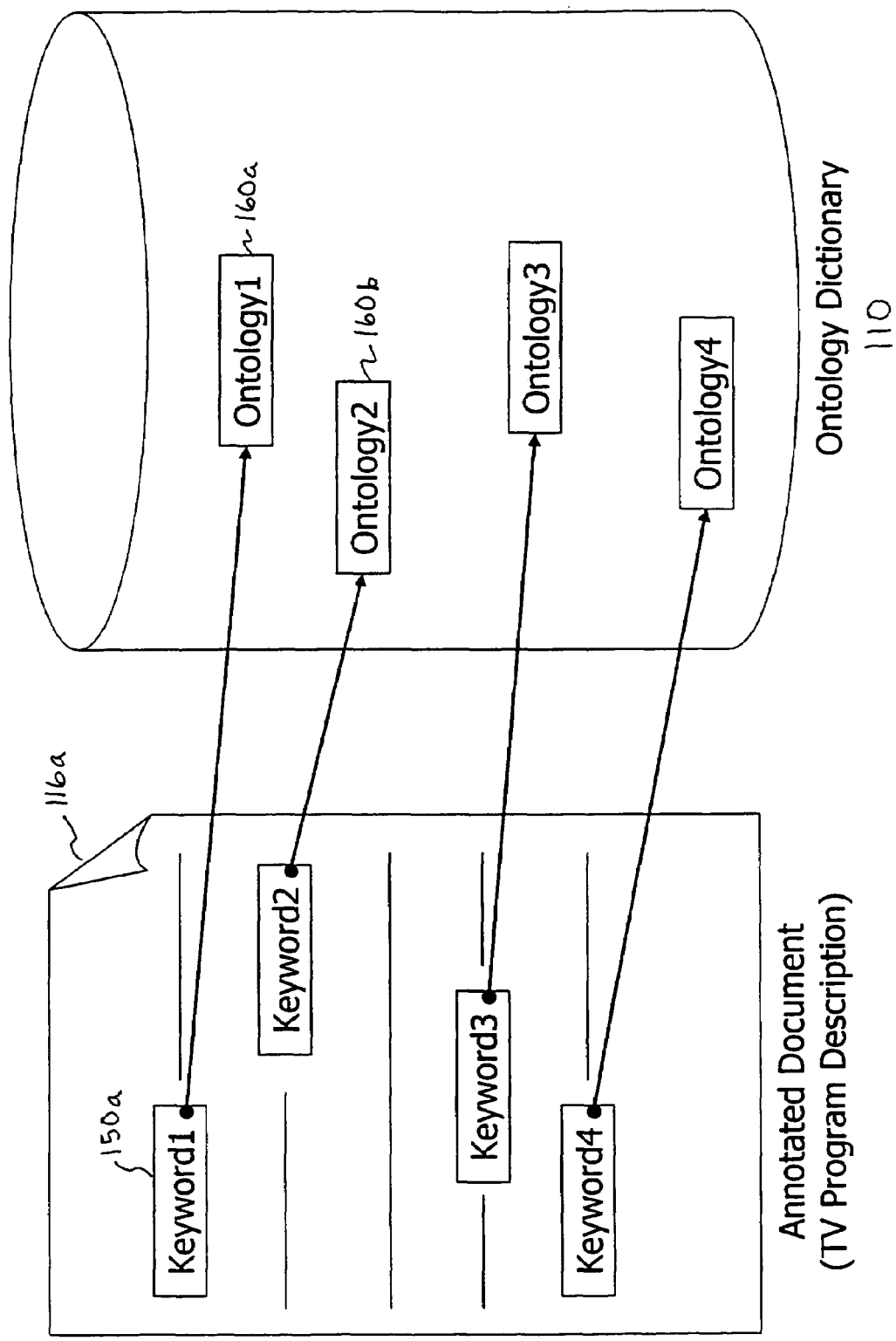
FIG. 1B illustrates an embodiment of program description document annotated with ontology from an ontology database.
Figure 1C:
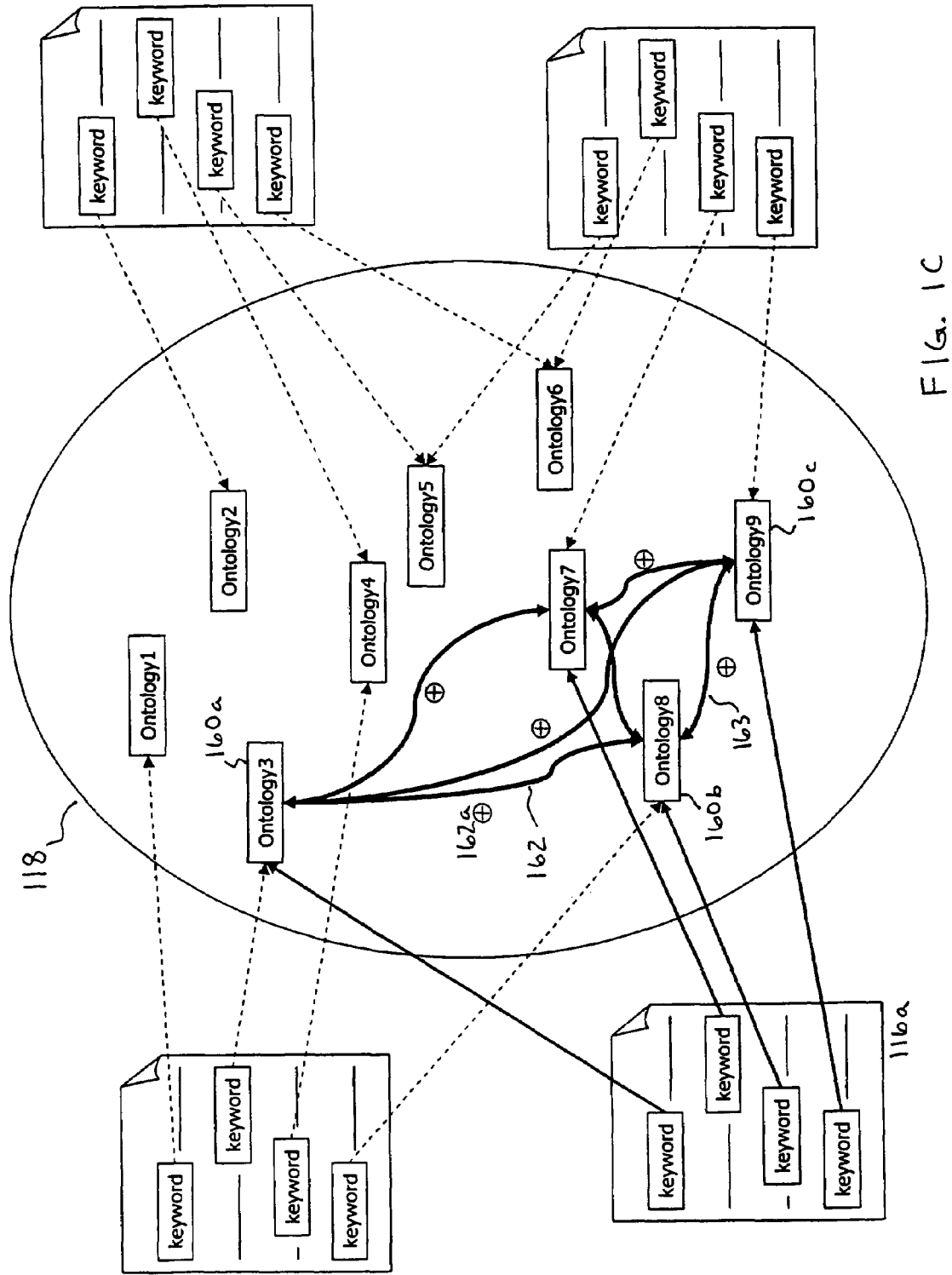
FIG. 1C illustrates an embodiment of a co-occurrence probabilistic graphical model.
Figure 1D:
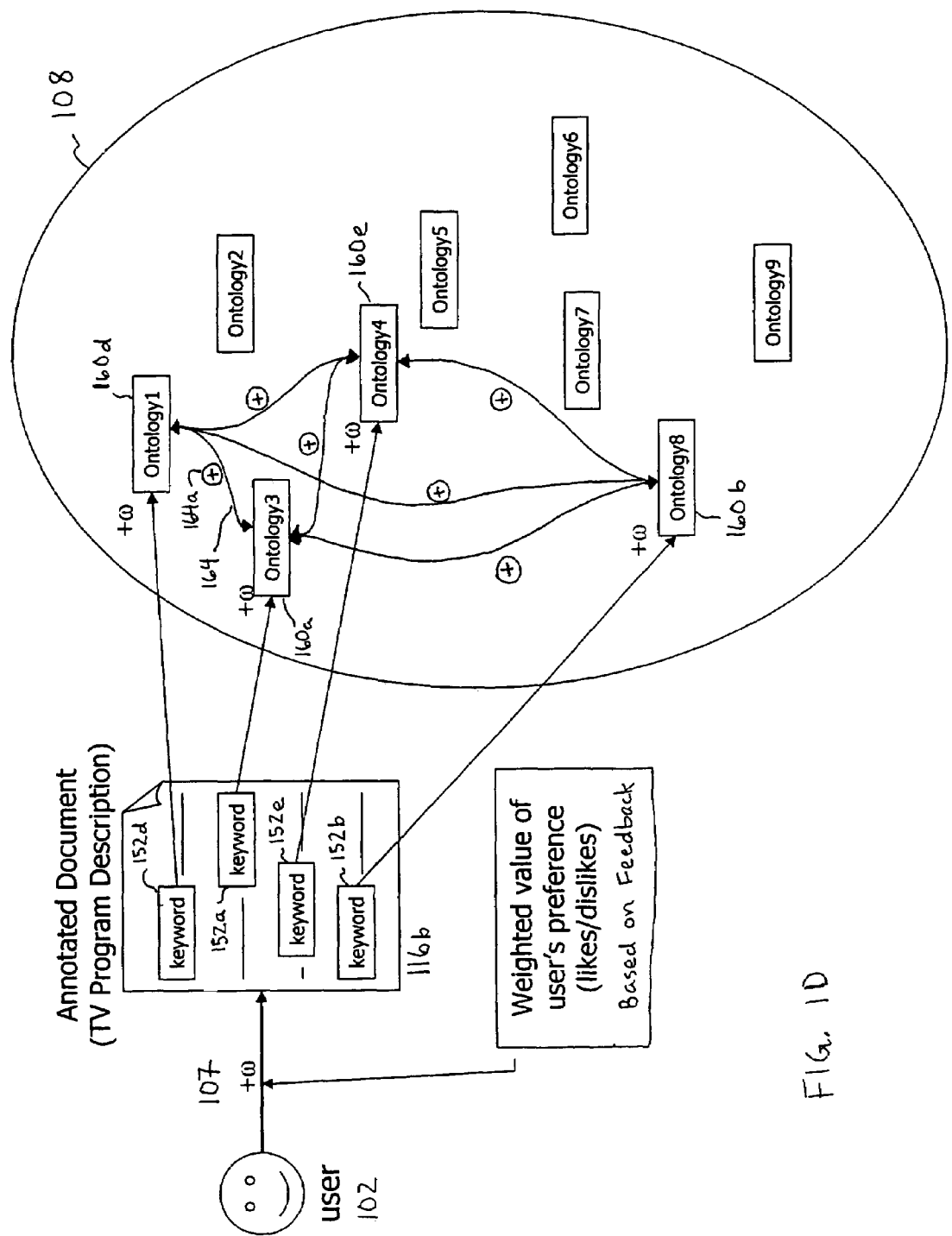
FIG. 1D illustrates an embodiment of a Belief of User's Preference model.

A system level overview of a hybrid personalization architecture to generate a list of preferred programs 120 is described with reference to FIG. 1A. FIGS. 1B–1D illustrate further details of personalization system 100. Personalization system 100 includes an Electronic Programming Guide (EPG) database 114 which stores program descriptions 115. In one embodiment, each program description is a document 115 including a set of keywords describing an associated program. The program may be a television program, an audio program, or other multimedia content. For example, in one embodiment, a television program for a baseball game may have an associated program description 115 document including the keywords: SPORTS, BASEBALL, SAN FRANCISCO, GIANTS.

The system 100 also includes an ontology database 110. The ontology database 110 includes machine-readable definitions generally referred to as ontology. In the computer arts, an ontology refers to a conceptual model describing the objects in some application domain (e.g. television programming) encoded in a formal, mathematical language. In one embodiment, the ontology database 110 includes a taxonomy or hierarchy of ontological concepts (e.g. "Baseball is an instance of a Sport"; "San Francisco is an instance of a City"), and also includes a set of rules which relate concepts to each other. In one embodiment, ontology database 110 includes semantic descriptions which represent documents for a specific domain, such as the EPG 114, as well as generic concepts, such as a user's 102 behavior or interaction with a television or a Personal Video Recorder (PVR). For example, the ontology associated with the EPG 114 may include categories such as Program Genre (e.g. NEWS, COMEDY, DRAMA, DOCUMENTARY, etc.) and Actors (e.g. MEG RYAN, TOM HANKS, etc.), among others. In one embodiment, the ontology describes human activities, such as SPORTS, TRAVEL, SHOPPING, etc. In one embodiment, the semantic structure of the ontology database 110 is custom generated for a particular application. In another embodiment, the ontology database 110 is an off-the-shelf database.

An annotation module 112 annotates the program descriptions from the EPG 114 with ontological concepts from the ontology database 110 to produce annotated documents 116. In one embodiment, keywords within the program descriptions 115 are associated with at least one ontological concept within the ontology database 110. In one embodiment, the documents 116 are stored in the EPG 114. In another embodiment, the annotation module 112 is unnecessary when a program description document 115 has already been annotated with ontological concepts, such as for example when ontological concepts have been added by a content provider. In one embodiment, a program description document 115 is annotated with ontological concepts through a keyword matching process. For example, in one embodiment, a keyword BASEBALL in the program description document 115 is matched to an ontological concept BASEBALL within the ontology database 110. In another embodiment, synonyms are used to associate keywords with ontological concepts. In yet another embodiment, annotation is performed automatically by applying a morphological analysis to the program descriptions of the EPG. Nouns which are extracted from the program descriptions by the morphological analysis are then associated with keywords, which are annotated with pre-defined ontological concepts.

The system 100 includes an ontology co-occurrence model 118. In one embodiment, the co-occurrence (CO) model 118 is a probabilistic graphical model for representing a co-occurrence probability of the ontological concepts within the annotated documents 116, i.e. the strength of the relationship between a pair of ontological concepts. The CO model 118 represents the probabilities of each pair of ontological concepts being associated with the same annotated document 116. A co-occurrence probability process, described below, uses the CO model 118 to identify the strength of the relationships between two concepts by calculating the co-occurrence probability of two ontological concepts. In one embodiment, the CO model 118 is based on documents 116 which represent programming within an EPG for a future time period, e.g. two weeks. The co-occurrence process uses the CO model 118 to determine the frequency for which a certain pair of ontological concepts appear within the same document 116. The co-occurrences are then normalized as a probability measure.

A user 102 of the personalization system 100 provides feedback 104 indicative of the degree of the user's preference (e.g. like or dislike) for a particular program. In one embodiment, explicit feedback is collected, such as a rating of a program by the user on a scale. For example, in one embodiment, the system 100 displays a list of programs on a graphical user interface (GUI), from which the user may select a program and assign a weighted value indicating his preference (like/dislike) for the selected program.

Other forms of feedback may be collected from the user to allow the system 100 to determine the user's degree of preference for a program. For example, in one embodiment, the system 100 obtains a user's preference through implicit feedback, such as by collecting data on the user's behavior. Aspects of the user's behavior may include viewing patterns such as which programs were viewed, the duration of viewing, frequency of viewing, etc. Additionally, when system 100 includes a Personal Video Recorder (PVR), a user's preferences may be determined based on their interaction with the PVR, such as which programs were recorded, viewed, retained, skipped or deleted, among others.

Based on the feedback 104 (explicit, implicit, or both) received from the user 102 by the system 100, a rating module 106 assigns a rating to an annotated document 116 associated with the rated program. Each rating is dependent upon the degree of the belief of the user's preference for the program. A belief of user's preference process, described below, generates a probabilistic graphical model 108 for representing the belief of the user's preference, hereinafter referred to as the Belief of User's Preference (BUP) model 108, using the ratings associated with the annotated documents 116.

The system 100 generates a list 120 of preferred programs, or a recommendations list, from the two models 118, 108. The system 100 performs a convolution between the CO model 118 and the BUP 108 model. In one embodiment, a convolution is a mathematical combination of two functions which involves multiplying the value of one function at a given point with the value of another function, the weighting function, for a displacement from that point and then integrating over all such displacements. Since the convolution is performed based on two distinct models (i.e. the co-occurrence model 118 and the belief of user's preference model 108), the system 100 has a hybrid personalization architecture, as the personalization is derived from two components. Thus, in one embodiment of the invention, a probabilistic graphical models are used for information filtering to provide an inference into which programs a user may prefer. The inference may be based on the correlation of ontology between the given user's feedback and the target program description documents.

FIG. 1B illustrates an embodiment of a program description document 116a annotated with ontological concepts 160a, 160b from the ontology database 110. For example, a keyword 150a is associated with an ontological concept 160a, and a keyword 150b is associated an ontological concept 160b.

FIG. 1C illustrates an embodiment of CO model 118. The CO model 118 includes a plurality of ontological concepts 160a, 160b, 160c selected from the ontology database 110. In one embodiment, the ontological concepts are represented by graphical nodes (or vertices) within the CO model 118.

The edges (or arcs) 162, 163 are links that represent the normalized strength of the co-occurrence probability of the two related ontological concepts existing in the same document 116a. For example, edge 163 represents the co-occurrence probability between concepts 160b and 160c.

In one embodiment, the potential of an edge 162 in the CO model 118 is the normalized strength of coupling or co-occurrence probability of the two ontological concepts of that edge. In other words, edge 162 has a potential 162a, which represents the probability that the ontological concepts 160a and 160b are represented within the same annotated document 116a.

FIG. 1D illustrates an embodiment of a Belief of User's Preference (BUP) model 108. In one embodiment, a rating 107 is a weighted value, +ω, which represents the belief of the user's preference for the program described by the document 116b. The rating 107 is based on the feedback 104 received from the user 102. In one embodiment, the weighted value is assigned to document 116b as a whole. In other words, the weighted value for an annotated document 116b is assigned to the ontological concepts associated with the keywords within the rated document 116b. For example, based on feedback from a user 102, a weighted value +ω is assigned to annotated program description document 116b. In constructing the BUP model 108, the weighted value is subsequently assigned to each of the various ontological concepts 160a, 160b, 160d, 160e respectively associated with the keywords 152a, 152b, 152d, 152e of the document 116b. In one embodiment, as additional feedback is accumulated from the user 102, the user's preference is learned by updating the state of the BUP model 108 with the additional rating data to reflect the belief of the user's preference of a particular program. In one embodiment, the potential of an edge 164 between two ontological concepts in the BUP model 108 is the normalized belief that is assigned directly from the user's relevant feedback and associated rating. In other words, edge 164 has a potential 164a, which represents the weighted value of the user's preference. For example, in one embodiment, potential 164a has a value of +ω, where a rating 107 of +ω is assigned to an annotated document 116b having keywords associated with ontological concepts 160a and 160d.

In conjunction with the above description of FIGS. 1C and 1D, embodiments are described in which probabilistic graphical models 118 and 108 include Markov networks. It will be appreciated, however, that other types of networks are contemplated for use with the probabilistic graphical models 118 and 108, such as belief networks. For example, in one embodiment, the models 108, 118 include a Bayesian network, which is a directed graph identifying cause and effect relationships. In another embodiment, the models 108, 118 include a finite mixture model, which is a derivation of a Bayesian network model.

A Markov model is an undirected graph having potentials assigned to each edge between nodes. A potential is a local property, (also referred to as a Markov property), and the interpretation of the potential depends on the background context of the network design. Each of the probabilistic graphical models 118 and 108 are associated with the ontology database 110. In one embodiment, each ontological concept is represented within the models 118, 108 as a random variable or node in a Markov network. In one embodiment, as described above, two Markov networks 118 and 108 are constructed by processes performed within system 100. In one embodiment, each network 118 and 108 has the same set of nodes and a same graph structure, however, each network has different values and interpretations for potentials.

Figure 2A:
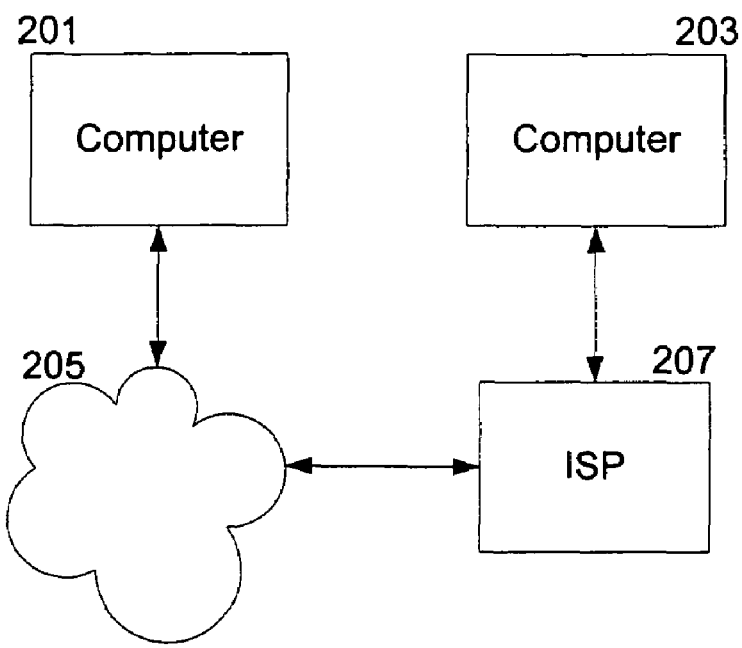
FIGS. 2A and 2B are diagrams of environments suitable for practicing embodiments of the invention.

In one embodiment, as shown in FIG. 2A, a computer 201 is part of, or coupled to a network 205, such as the Internet, to exchange data with another computer 203, as either a client or a server computer. In one embodiment, the system 100 of FIG. 1A is implemented with a computer 201. For example, computer 201 may be included within a television set, a set-top box, or a Personal Video Recorder (PVR), among other devices. In one embodiment, annotation block 112 is implemented with a computer 201. Typically, a computer 203 couples to the Internet through an ISP (Internet Service Provider) 207 and executes a conventional Internet browsing application to exchange data with a server. Other types of applications allow clients to exchange data through the network 205 without using a server. It is readily apparent that embodiments of the invention are not limited to use with the Internet; directly coupled and private networks are also contemplated.

Figure 2B:
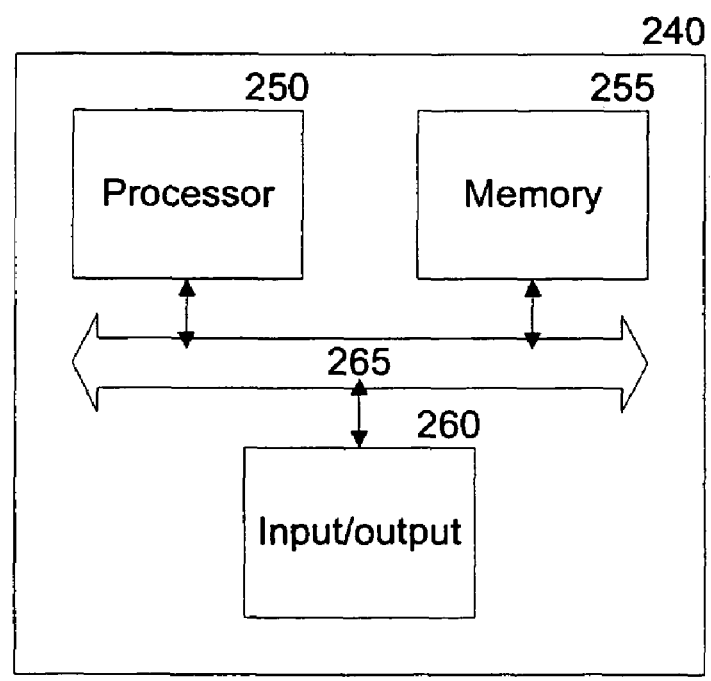

One embodiment of a system suitable for use in the environments of FIG. 2A is illustrated in FIG. 2B. The system 240 includes a processor 250, memory 255 and input/output capability 260 coupled to a system bus 265. The memory 255 is configured to store instructions which, when executed by the processor 250, perform the methods described herein. The memory 255 may also store data for the EPG 114 of FIG. 1A. In one embodiment, input/output 260 provides for the delivery and display of the data for the recommendations list 120 of FIG. 1A or portions or representations thereof. Input/output 260 also encompasses various types of machine or computer-readable media, including any type of storage device that is accessible by the processor 250. One of skill in the art will immediately recognize that the term "computer-readable medium/media" or "machine-readable medium/media" further encompasses a carrier wave that encodes a data signal. It will also be appreciated that the computer is controlled by operating system software executing in memory 255. Input/output and related media 260 store the machine/computer-executable instructions for the operating system and methods of embodiments of the invention as well as the data for the list of preferred programs 120 of FIG. 1A.

The description of FIGS. 2A–2B is intended to provide an overview of computer hardware and various operating environments suitable for implementing embodiments of the invention, but is not intended to limit the applicable environments. It will be appreciated that the system 240 is one example of many possible devices that have different architectures. A typical device will usually include at least a processor, memory, and a bus coupling the memory to the processor. Such a configuration encompasses personal computer systems, network computers, and television based systems, such as receivers or tuners, Personal Video Recorders (PVRs), Digital Video Recorders (DVRs), Web TVs, or set-top boxes. Set-top boxes include any of several different electronic devices that may be used to enable media services to displayed on a user's television set or other display device. Furthermore, handheld devices, such as cell phones and personal digital assistants, and similar devices are also encompassed within such a configuration. One of skill in the art will immediately appreciate that embodiments of the invention can be practiced with other system configurations, including multiprocessor systems, minicomputers, mainframe computers, and the like. Embodiments of the invention can also be practiced in distributed computing environments where tasks are performed by remote processing devices that are linked through a communications network.

Figure 3:
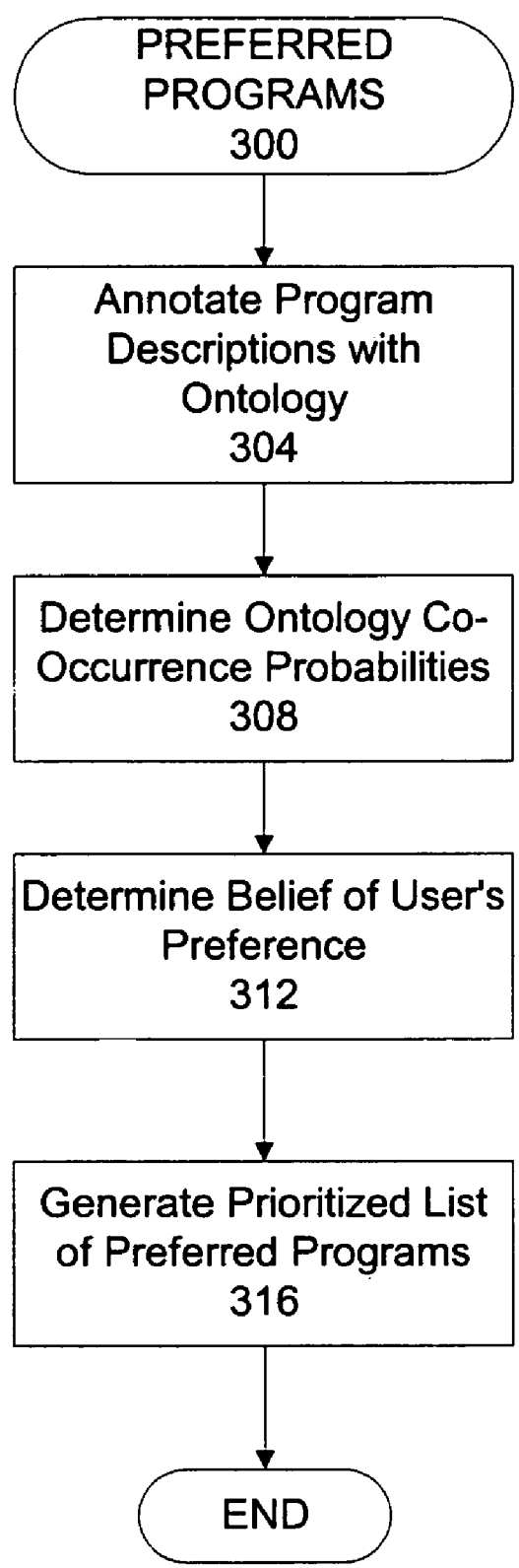
FIG. 3 is a flow diagram of a preferred programs method to be performed by a computer according to an embodiment of the invention.
Figure 4:
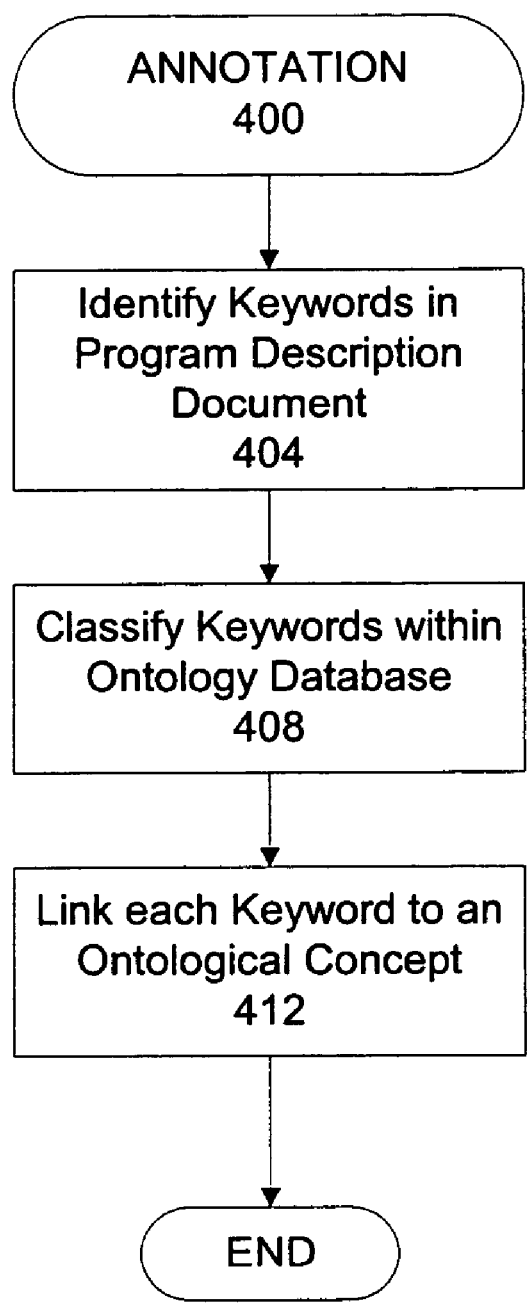
FIG. 4 is a flow diagram of an annotation method to be performed by a computer according to an embodiment of the invention.
Figure 5:
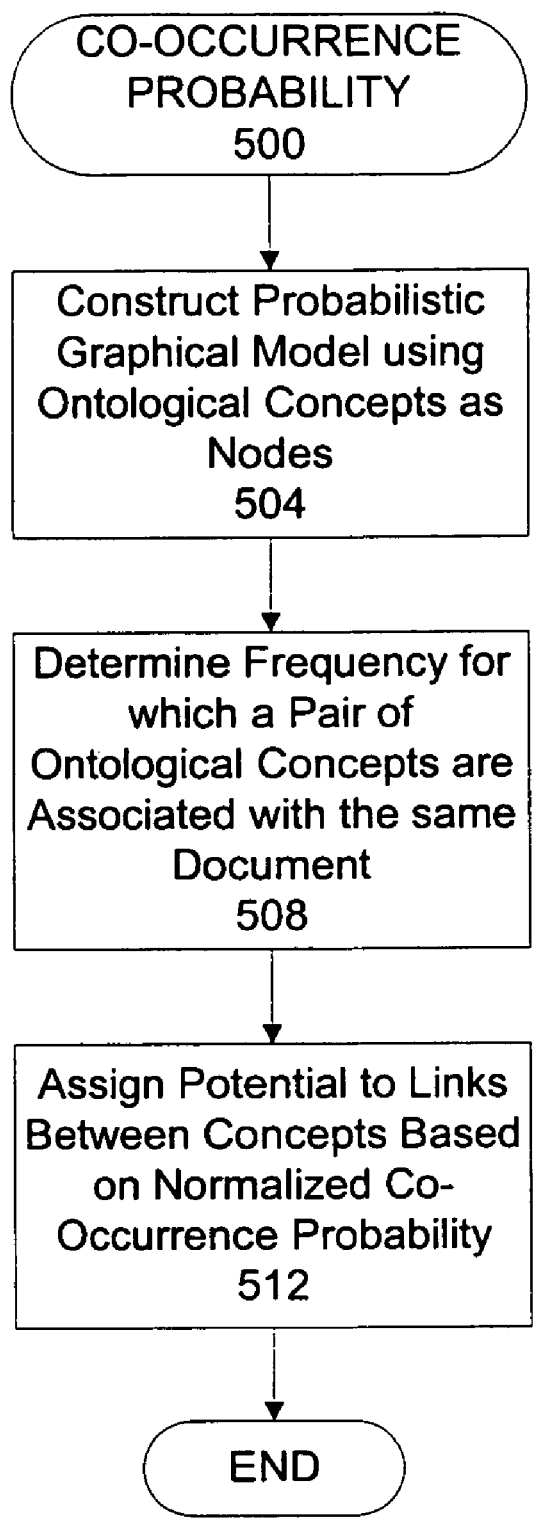
FIG. 5 is a flow diagram of a co-occurrence probability method to be performed by a computer according to an embodiment of the invention.
Figure 6:
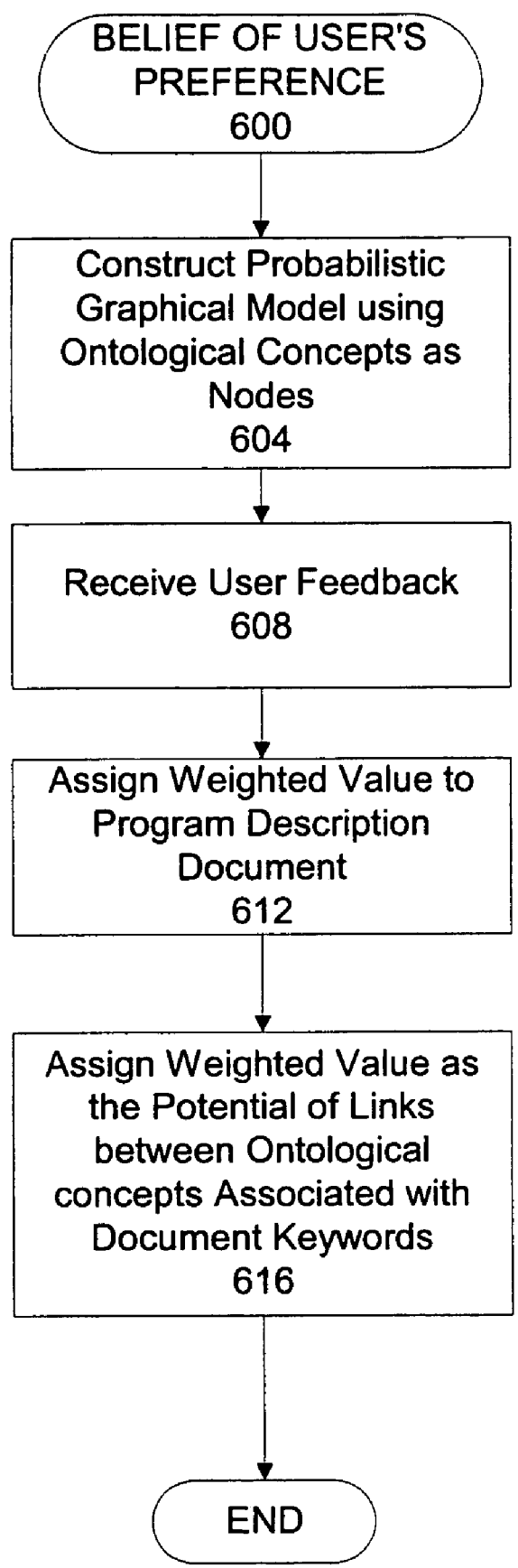
FIG. 6 is a flow diagram of a belief of user's preference method to be performed by a computer according to an embodiment of the invention.
Figure 7:
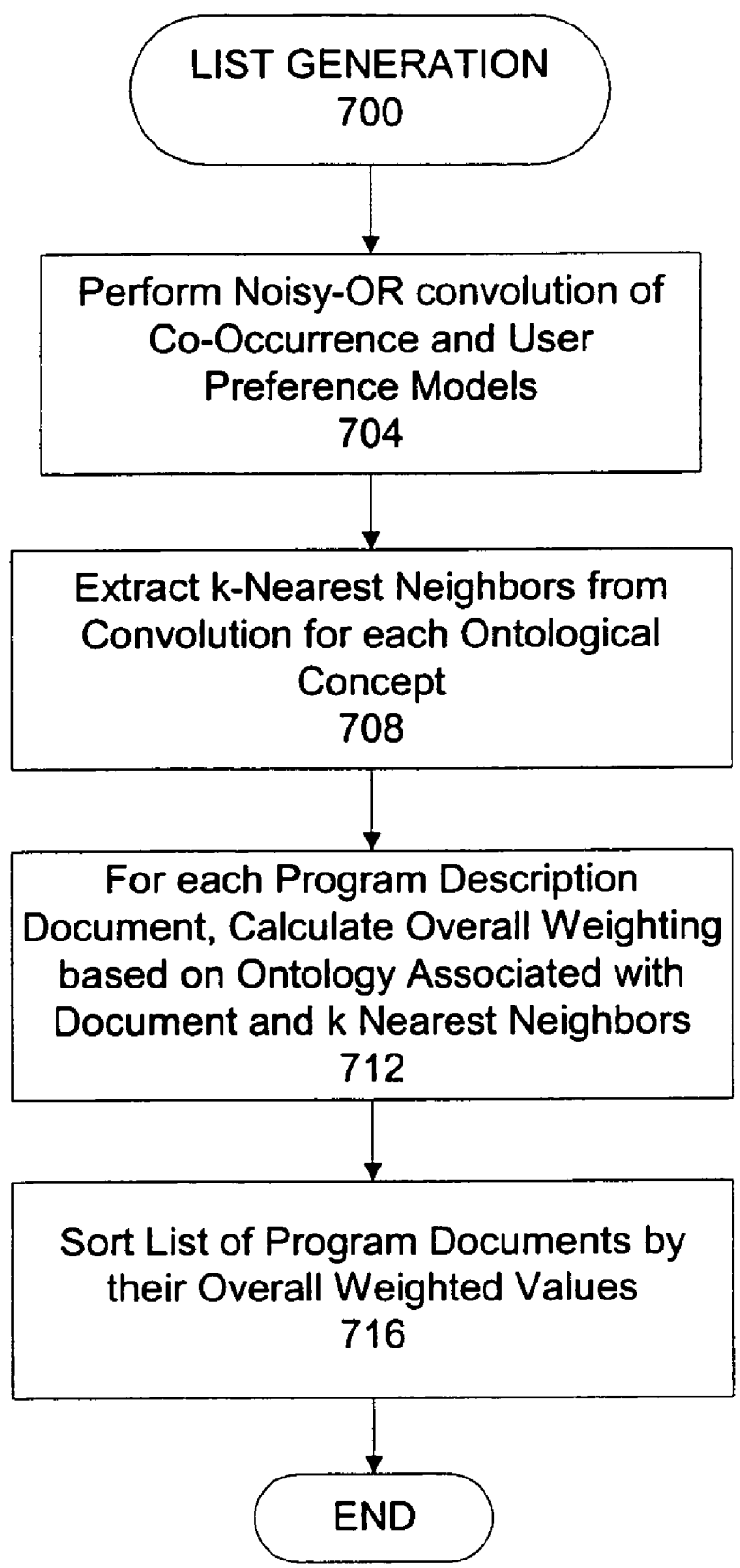
FIG. 7 is a flow diagram of a list generation method to be performed by a computer according to an embodiment of the invention.

Next, the particular methods of embodiments of the invention are described in terms of computer software with reference to a series of flow diagrams. FIG. 3 illustrates a high-level description of methods performed by system 100 of FIG. 1A. FIG. 4 illustrates an embodiment of an Annotation method 400, which performs the operations previously described in connection with annotation module 112 of FIG. 1A. FIG. 5 illustrates an embodiment of a Co-Occurrence Probability method 500, which generates the CO model 118 of FIG. 1A. FIG. 6 illustrates an embodiment of a Belief of User's Preference method 600, which generates the BUP model 108 of FIG. 1A. FIG. 7 illustrates an embodiment of a List Generation method 700, which generates list 120 of FIG. 1A.

Referring first to FIG. 3, the acts to be performed by a processor executing the Preferred Programs method 300 are shown. FIG. 3 illustrates an embodiment of the methods performed within system 100 of FIG. 1A. The processes represented by blocks 304 to 316 are described in greater detail below. At block 304, the method 300 annotates program description documents with ontological concepts from an ontology database. In one embodiment, the annotation module 112 of FIG. 1A performs the processing represented by block 304. At block 308, the method 300 determines ontology co-occurrence probabilities. In one embodiment, the processing represented by block 308 generates the CO model 118 of FIG. 1A. At block 312, the method 300 determines a belief of the user's preference. In one embodiment, the processing represented by block 312 generates the BUP model 108 of FIG. 1A. At block 316, the method 300 generates a prioritized list of preferred programs. In one embodiment, the processing represented by block 316 generates the list 120 of FIG. 1A.

Referring to FIG. 4, the acts to be performed by a processor executing the Annotation method 400 are shown. Annotation method 400 is an embodiment of the processing at block 304 of FIG. 3. At block 404, the method 400 identifies keywords within each program description document. At block 408, the method 400 classifies the keywords within an ontology. For example, in one embodiment, an ontology database, such as ontology database 110 of FIG. 1A, provides the ontological structure for the keywords. At block 412, the method 400 links each keyword within the document to an ontological concept within the ontology. In one embodiment, metadata is added to the keywords within the document to indicate that an ontological concept is associated with a particular keyword. In one embodiment, the Annotation method 400 is performed on each program description stored in an Electronic Programming Guide (EPG) database, such as the EPG 114 of FIG. 1A. In one embodiment, the method 400 produces documents annotated with ontology. In another embodiment, the annotation method is unnecessary where the program description document is already annotated with ontology.

Referring to FIG. 5, the acts to be performed by a processor executing the Co-Occurrence Probability method 500 are shown. Co-Occurrence Probability method 500 is an embodiment of the processing at block 308 of FIG. 3. At block 504, the method 500 constructs a probabilistic graphical model having nodes representing ontological concepts. In one embodiment, the ontological concepts represented by the nodes are selected from the ontology database 110 of FIG. 1A. At block 508, the method 500 determines the frequency for which a pair of ontological concepts are associated with the same program description document. In other words, the method 500 determines the co-occurrence frequency of a pair of ontological concepts. For example, in one embodiment, where there are ten documents having at least one of two ontological concepts in them, if the two ontological concepts are both associated with four of the ten documents, then the co-occurrence frequency of the concepts is 4/10 or 0.4. At block 512, the method 500 assigns a potential to each edge between two nodes representing ontological concepts. In one embodiment, the potential is based on the normalized co-occurrence probability of the two ontological concepts.

Referring to FIG. 6, the acts to be performed by a processor executing the Belief of User's Preference method 600 are shown. The Belief of User's Preference method 600 is an embodiment of the processing at block 312 of FIG. 3. At block 604, the method 600 constructs a probabilistic graphical model, using ontological concepts as nodes. In one embodiment, the ontological concepts represented by the nodes are selected from the ontology database 110 of FIG. 1A. At block 608, the method 600 receives feedback from a user. The feedback may be explicit or implicit. For example, in one embodiment, a user provides explicit feedback by indicating a score or rating for a particular program. In another embodiment, implicit feedback is gained from the user based on the user's behavior, such as choice of programming viewed or recorded.

At block 612, the method 600 assigns a weighted feedback value to a program description document associated with a program for which feedback was received from the user, whether explicit or implicit. At block 616, the method 600 assigns the weighted values as a potential of the edge between two ontological concepts which are both associated within a particular rated program description. By way of example, in one embodiment, a user explicitly rates a Baseball program (e.g. San Francisco Giants vs. Los Angeles Dodgers) by giving the program a 7 out of 10 rating. The method 600 then assigns the program description document associated with the program a weighted value of 7/10 or 0.7. Assuming the document includes both of the keywords SAN FRANCISCO and BASEBALL, and the keywords are associated with the ontological concepts CALIFORNIA and SPORTS, respectively, the method 600 assigns a weighted value of 0.7 to an edge between the ontological concepts CALIFORNIA and SPORTS within the probabilistic graphical model.

Referring to FIG. 7, the acts to be performed by a processor executing the List Generation method 700 are shown. List Generation method 700 is an embodiment of the processing at block 316 of FIG. 3. At block 704, the method 700 performs a noisy-OR convolution of the co-occurrence and user preference models. By noisy-OR, it is meant that the weighted potentials of each edge are considered in performing the convolution. At block 708, the method 700 extracts the k-nearest neighbors from the convolution for each ontological concept. The value of k represents a number of nearest neighbors considered among the ontological concepts. A suitable value for k may be determined experimentally based on the particular data set used. At block 712, for each program description document, the method 700 calculates an overall weighting for the document based on the ontological concepts associated with the document and their respective k-nearest neighbors. This type of extraction may provide a more accurate measure of personalized relevance of ontological concepts based on a learnt user model.

In one embodiment, in determining the overall weighting of a program description document, $D_i$, the preference probability $P_i$ (i.e. the probability that a user will like or dislike the program represented by the document) for the document $D_i$ is determined using a noisy-OR convolution function applied to the CO model and the BUP model. In one embodiment, the noisy-OR convolution is calculated as:

$$P_i = \sum_{j=1}^{n} 1 - (1-x_j)(1-y_j), \quad (1)$$

where n represents the number of ontological concepts associated with the document $D_i$, $x_j$ represents the normalized co-occurrence probability of the particular ontological concept with another ontological concept within the document, $y_j$ represents the normalized belief probability associated with the particular ontological concept, and where $0<x_j$, $y_j<1$. The co-occurrence probability $x_j$ represents the strength of the relationship between two ontological concepts. The belief probability $y_j$ represents the user's preference derived from feedback. The probabilities $P_i$ are then used to determine an overall weighting for the documents. It will be appreciated that other probability function besides a noisy-OR convolution may be used with embodiments of the invention.

For each program description document, the method 700 calculates its overall weighting based on the ontological concepts associated with the document and the ontology's k nearest neighbors. The method sorts the weighted documents into a list representing the user's preferred programs, i.e. programs which the user is likely to prefer for viewing. In one embodiment, the list is used to recommend programs for the viewer to watch. For example, programs stored in the EPG 114 of FIG. 1A may be recommended for viewing. In another embodiment, the list is used to identify programs for automatic recording by a PVR or similar device, which permits viewing at a later time. In yet another embodiment, the list is used to sort programs or content which the user has already stored or recorded on a device such as a PVR. This may be beneficial for users which have a large amount of recorded content, as it provides a means for the user to quickly browse through recorded content and identify which programs are more likely to be of interest to them. It will be appreciated that the list may be applicable in other situations to identify preferred content to the user.

At block 716, the method 700 sorts documents into a list according to their overall weighted values. In one embodiment, the list is then recommended to a user. For example, in one embodiment, the list identifies upcoming programs which may be of interest to the user. In another embodiment, the list identifies programs available for viewing, such as those stored locally on a PVR, in their order of the likely degree of preference by the user. In one embodiment, the list is presented on a graphical user interface (GUI). A user may then select recommended programming from the list through the GUI.

The methods described above constitute computer programs made up of computer-executable instructions illustrated as blocks (acts) within the flow diagrams of FIGS. 3–7. Describing the methods by reference to a flow diagram enables one skilled in the art to develop such programs including such instructions to carry out the methods on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer processes may be incorporated into the methods illustrated in FIGS. 3–7 without departing from the scope of the invention and that no particular order is implied by the arrangement of blocks shown and described herein.

A hybrid personalization architecture using ontology and probabilistic graphical models has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention.

While the invention is not limited to any particular implementation, for sake of clarity a simplified system level overview of the operation of an embodiment of the invention has been described with reference to FIG. 1A. Therefore, it is manifestly intended that this invention be limited only by the following claims and equivalents thereof.

What is claimed is:

1. A computerized method comprising:
   determining belief probabilities for ontological concepts within a preference model representing a belief of user preferences, wherein the belief probabilities are based on user feedback;
   performing a convolution of the belief probabilities and ontology co-occurrence probabilities; and
   generating a prioritized list from a plurality of documents based on the convolution, wherein the prioritized list is used to filter data for output to the user.

2. The computerized method of claim 1, further comprising calculating the ontology co-occurrence probabilities for ontological concepts within a co-occurrence model, the ontology co-occurrence probabilities representing a probability of two ontological concepts being associated with a single document of the plurality of documents.

3. The computerized method of claim 2, wherein the preference model and the co-occurrence model include probabilistic graphical models.

4. The computerized method of claim 3, wherein the preference model and the co-occurrence model include Markov networks.

5. The computerized method of claim 3, wherein the preference model and the co-occurrence model include Bayesian networks.

6. The computerized method of claim 3, wherein ontological concepts within the preference model and the co-occurrence model are represented by nodes within the models.

7. The computerized method of claim 2, wherein the ontological concepts within the preference model and the ontological concepts within the co-occurrence model are the same.

8. The computerized method of claim 1, further comprising associating keywords of the plurality of documents with the ontological concepts within the preference model.

9. The computerized method of claim 1, further comprising assigning an overall weighting value to each of the plurality of documents based on the convolution.

10. The computerized method of claim 1, wherein generating the prioritized list comprises prioritizing the plurality of documents by an overall weighted value.

11. The computerized method of claim 1, further comprising recording content associated with a document from the prioritized list.

12. The computerized method of claim 1, further comprising presenting the prioritized list through a graphical user interface.

13. The computerized method of claim 1, further comprising selecting a document from the prioritized list.

14. The computerized method of claim 1, further comprising receiving the user feedback, wherein the feedback is selected from the group consisting of explicit feedback and implicit feedback.

15. The computerized method of claim 14, wherein the feedback is received through a personal video recorder.

16. The computerized method of claim 1, wherein the convolution is a noisy-OR convolution.

17. The computerized method of claim 1, wherein generating the prioritized list comprises extracting the k nearest neighbors for each ontological concept based on the convolution to determine an overall weighted value, where k is a predefined value.

18. The computerized method of claim 1, wherein the documents are television program description documents.

19. The computerized method of claim 1, wherein the documents describe multimedia content.

20. An apparatus comprising:
means for determining belief probabilities for ontological concepts within a preference model representing a belief of user preferences, wherein the belief probabilities are based on user feedback;
means for performing a convolution of the belief probabilities and ontology co-occurrence probabilities; and
means for generating a prioritized list from a plurality of documents based on the convolution, wherein the prioritized list is used to filter data for output to the user.

21. The apparatus of claim 20, further comprising means for calculating the ontology co-occurrence probabilities for ontological concepts within a co-occurrence model, the ontology co-occurrence probabilities representing a probability of two ontological concepts being associated with a single document of the plurality of documents.

22. The apparatus of claim 21, wherein the ontological concepts within the preference model and the ontological concepts within the co-occurrence model are the same.

23. The apparatus of claim 21, wherein the preference model and the co-occurrence model include probabilistic graphical models.

24. The apparatus of claim 22, wherein the ontological concepts within the preference model and the co-occurrence model are represented by nodes within the models.

25. The apparatus of claim 20, further comprising means for associating keywords of the plurality of documents with the ontological concepts within the preference model.

26. The apparatus of claim 20, further comprising means for assigning an overall weighting value to each of the plurality of documents based on the convolution.

27. The apparatus of claim 20, wherein the means for generating the prioritized list comprises means for prioritizing the plurality of documents by an overall weighted value.

28. The apparatus of claim 20, further comprising means for recording content associated with a document from the prioritized list.

29. The apparatus of claim 20, further comprising means for selecting a document from the prioritized list.

30. The apparatus of claim 20, further comprising means for receiving the user feedback, wherein the feedback is selected from the group consisting of explicit feedback and implicit feedback.

31. The apparatus of claim 20, wherein the convolution is a noisy-OR convolution.

32. The apparatus of claim 20, wherein the means for generating the prioritized list comprises means for extracting the k nearest neighbors for each ontological concept based on the convolution to determine an overall weighted value, where k is a predefined value.

33. A machine-readable medium having executable instructions to cause a machine to perform a method comprising:
determining belief probabilities for ontological concepts within a preference model representing a belief of user preferences, wherein the belief probabilities are based on user feedback;
performing a convolution of the belief probabilities and ontology co-occurrence probabilities; and
generating a prioritized list from a plurality of documents based on the convolution, wherein the prioritized list is used to filter data for output-to the user.

34. The machine-readable medium of claim 33, wherein the method further comprises calculating the ontology co-occurrence probabilities for ontological concepts within a co-occurrence model, the ontology co-occurrence probabilities representing a probability of two ontological concepts being associated with a single document of the plurality of documents.

35. The machine-readable medium of claim 34, wherein the ontological concepts within the preference model and the ontological concepts within the co-occurrence model are the same.

36. The machine-readable medium of claim 34, wherein the preference model and the co-occurrence model include probabilistic graphical models.

37. The machine-readable medium of claim 36, wherein the preference model and the co-occurrence model include Markov networks.

38. The machine-readable medium of claim 36, wherein the preference model and the co-occurrence model include Bayesian networks.

39. The machine-readable medium of claim 36, wherein the ontological concepts within the preference model and the co-occurrence model are represented by nodes within the models.

40. The machine-readable medium of claim 33, wherein the method further comprises associating keywords of the plurality of documents with the ontological concepts within the preference model.

41. The machine-readable medium of claim 33, wherein the method further comprises assigning an overall weighting value to each of the plurality of documents based on the convolution.

42. The machine-readable medium of claim 33, wherein the method further comprises generating the prioritized list comprises prioritizing the plurality of documents by an overall weighted value.

43. The machine-readable medium of claim 33, wherein the method further comprises recording content associated with a document from the prioritized list.

44. The machine-readable medium of claim 33, wherein the method further comprises selecting a document from the prioritized list.

45. The machine-readable medium of claim 33, wherein the method further comprises receiving the user feedback, wherein the feedback is selected from the group consisting of explicit feedback and implicit feedback.

46. The machine-readable medium of claim 45, wherein the feedback is received through a personal video recorder.

47. The machine-readable medium of claim 33, wherein the convolution is a noisy-OR convolution.

48. The machine-readable medium of claim 33, wherein generating the prioritized list further comprises extracting the k nearest neighbors for each ontological concept based on the convolution to determine an overall weighted value, where k is a predefined value.

49. The machine-readable medium of claim 33, wherein the documents are television program description documents.

50. The machine-readable medium of claim 33, wherein the documents describe multimedia content.

51. A system comprising:
a processor coupled to a memory through a bus; and
a personalization process executed by the processor from the memory to cause the processor to determine belief probabilities for ontological concepts within a preference model representing a belief of user preferences, wherein the belief probabilities are based on user feedback, perform a convolution of the belief probabilities and ontology co-occurance probabilities, and generate a prioritized list from a plurality of documents based on the convolution, wherein the prioritized list is used to filter data for output to the user.

52. The system of claim 51, wherein the personalization process further causes the processor to calculate the ontology co-occurrence probabilities for ontological concepts within a co-occurrence model, the ontology co-occurrence probabilities representing a probability of two ontological concepts being associated with a single document of the plurality of documents.

53. The system of claim 52, wherein the preference model and the co-occurrence model include probabilistic graphical models.

54. The system of claim 53, wherein the preference model and the co-occurrence model include Markov networks.

55. The system of claim 53, wherein the preference model and the co-occurrence model include Bayesian networks.

56. The system of claim 53, wherein the ontological concepts within the preference model and the co-occurrence model are represented by nodes within the models.

57. The system of claim 52, wherein the ontological concepts within the preference model and the ontological concepts within the co-occurrence model are the same.

58. The system of claim 51, wherein the personalization process further causes the processor to associate keywords of the plurality of documents with the ontological concepts within the preference model.

59. The system of claim 51, wherein the personalization process further causes the processor to assign an overall weighting value to each of the plurality of documents based on the convolution.

60. The system of claim 51, wherein generating the prioritized list comprises prioritizing the plurality of documents by an overall weighted value.

61. The system of claim 51, wherein the personalization process further causes the processor to record content associated with a document from the prioritized list.

62. The system of claim 51, wherein the personalization process further causes the processor to present the prioritized list through a graphical user interface.

63. The system of claim 51, wherein the personalization process further causes the processor to select a document from the prioritized list.

64. The system of claim 51, further comprising an input-output device coupled to the processor through the bus, wherein the personalization process further causes the input-output device to receive the user feedback, wherein the feedback is selected from the group consisting of explicit feedback and implicit feedback.

65. The system of claim 64, wherein the feedback is received through a personal video recorder.

66. The system of claim 51, wherein the convolution is a noisy-OR convolution.

67. The system of claim 51, wherein generating the prioritized list comprises extracting the k nearest neighbors for each ontological concept based on the convolution to determine an overall weighted value, where k is a predefined value.

68. The system of claim 51, wherein the documents are television program description documents.

69. The system of claim 51, wherein the documents describe multimedia content.

* * * * *